M. RAY.
FRICTIONAL-GEARING.

No. 177,278. Patented May 9, 1876.

WITNESSES:
Chas. A. Pettit
John C. Kennon

INVENTOR:
Moses Ray
BY Munn & Co.
ATTORNEYS.

UNITED STATES PATENT OFFICE.

MOSES RAY, OF VALLEY GROVE, WEST VIRGINIA.

IMPROVEMENT IN FRICTIONAL GEARING.

Specification forming part of Letters Patent No. 177,278, dated May 9, 1876; application filed March 31, 1876.

*To all whom it may concern:*

Be it known that I, MOSES RAY, of Valley Grove, in the county of Ohio and State of West Virginia, have invented a new and Improved Frictional Gearing; and I do hereby declare that the following is a full, clear, and exact description of the same, reference being had to the accompanying drawing, forming part of this specification, in which—

Figure 1:
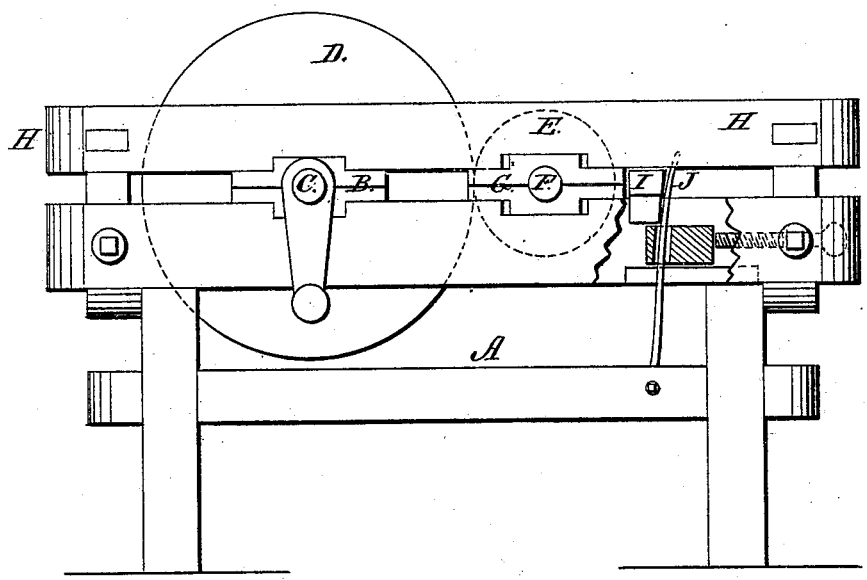
Figure 2:
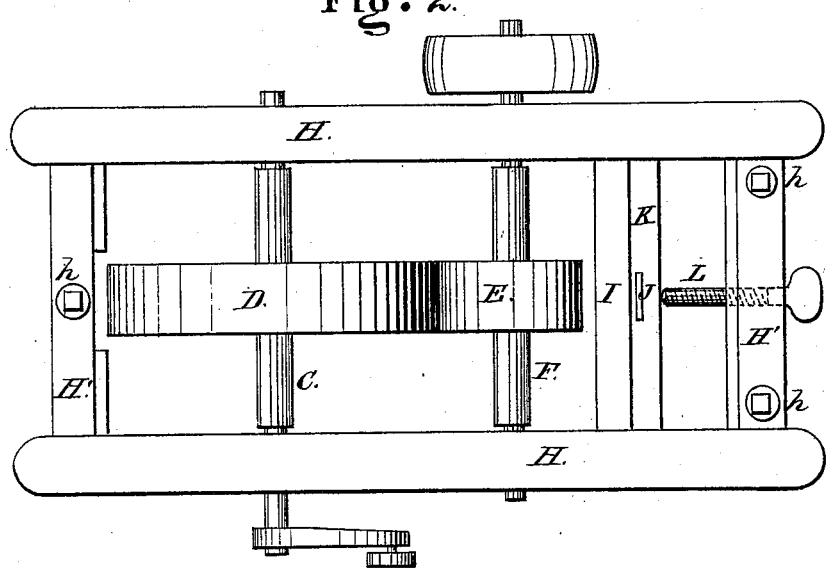

Figure 1 is a side elevation; Fig. 2, a plan view.

The invention is an improvement upon frictional gearing, so as to give an even and uniform bearing of the pressure-wheel upon the one that is to be driven by it, as hereinafter described.

A represents the frame of machine, in which are placed the fixed bearings B B of the crank-shaft C. On this shaft is placed a large smooth-faced wheel, D, that is intended to drive, by friction, a small smooth-faced wheel, E, that is arranged upon and revolves with a shaft, F. The journals of the latter revolve in slide-bearings G G. The bearings B B and G G are maintained in their proper position by a superposed detachable frame, H, which is held by the clamp-screws *h* passing through the end bars H' H'.

I am aware that friction-wheels to transmit the motive power are not in themselves new, and that one of them has been heretofore made adjustable to or from the other; but my object is not only to provide a more convenient mode than is now known to the public of throwing the wheels in or out of gear, but to produce a yielding pressure, that will prevent a fracture of machinery by any sudden and unexpected strain. For this purpose I place a loose cross-bar, I, so as to press against each of the slide-bearings, and support it at the rear against a spring, J, made fast in a subjacent bar, J'. The spring is, preferably, a simple elastic metal plate passing vertically through the notch of a movable bar, K, which is carried on ways by a screw, L, and on whose front may rest the bottom of cross-bar I.

By this arrangement of parts I am enabled to press the wheel E with greater or less force against the actuating-wheel D, according to the requirement of heavy or light work.

This invention has been applied in connection with machinery, and the practical test has exhibited great advantage over devices now employed for like purposes.

I am aware that two screws have been employed to act against an elastic cushion in each journal-box; but it is thus extremely difficult, if not impossible, to adjust these separate screws so as to give a uniform bearing of the pressure-wheel upon the one to be actuated; hence

What I claim is—

The combination of a loose bar, I, against the slide-bearings, a movable bar, K, in contact therewith, and a single median screw, L, with the spring J, as set forth.

MOSES RAY.

Witnesses:
SOLON C. KEMON,
CHAS. A. PETTIT.